3,188,231
PROCESS OF MAKING CRUCIBLES
Zbigniew D. Jastrzebski, Easton, Pa., assignor to the United States of America as represented by the United States Atomic Energy Commission
No Drawing. Filed July 9, 1963, Ser. No. 293,914
1 Claim. (Cl. 117—123)

This invention deals with a process of making large-size refractory crucibles, or structural elements or "shapes" therefor, that are suitable for the processing of molten salt solutions. The crucibles or shapes made by the process of this invention are primarily intended for containers holding molten halide and metal solutions, respectively, of components, such as neutron-irradiated nuclear fuel, which are to be separated by the selective reduction of uranium halide with a magnesium-zinc alloy.

It has been found rather difficult heretofore to make large crucibles that were resistant to thermal shock and impervious to, as well as nonreactive with, a mixture of molten materials, such as of alkali metal halides, magnesium halide, uranium halide, metallic magnesium, aluminum and zinc. Beryllium oxide has been tried for the purpose specified, but it was found that large crucibles could not be made of sufficient density; they were very porous so that containment of the fused salt solution was impossible; the salt solution gradually penetrated the walls of the crucible.

It is an object of this invention to provide a process for the preparation of refractory beryllium oxide crucibles that are resistant to mechanical and thermal shocks frequently occurring during the processing of salt solutions.

It is another object of this invention to provide a process for the preparation of refractory beryllium oxide crucibles that are characterized by great density and imperviousness to molten halide solutions as well as to molten magnesium and zinc.

It is also an object of this invention to provide a process for the preparation of refractory beryllium oxide crucibles that are nonreactive with molten zinc, magnesium and uranium halides or with molten magnesium or zinc metals at temperatures of about 900° C.

It is finally also an object of this invention to provide a process for the preparation of refractory beryllium oxide crucibles which is suitable for the fabrication of large-size crucibles for plant operation.

These objects are accomplished by mixing crushed beryllium oxide with a calcium-aluminate-base cement; adding water to the mixture obtained; molding the mixture into the shapes desired; drying the shapes in air; heating and firing the shapes; coating the surface of the shapes with a glaze composition containing aluminum oxide, calcium oxide and beryllium oxide or magnesium oxide; and firing the glazed shapes.

The beryllium oxide is preferably used after it has been fused and fired. After firing, it is cooled, crushed and screened. The fraction having particle sizes between minus 320 and minus 8 mesh is best suitable.

Calcium aluminate alone can be used as the cement, but calcium aluminates to which has been added magnesium oxide or strontium oxide have been found more satisfactory. For instance, a cement prepared from 42% by weight of calcium oxide, 52% by weight of aluminum oxide and 6% by weight of magnesium oxide and a cement prepared from 35% by weight of calcium oxide, 55% by weight of aluminum oxide and 10% by weight of strontium oxide were superior to calcium aluminate alone or with other additives. (All percentages in this description are percents by weight.)

The amount of cement may range from 8 to 15% of the beryllia-cement mixture, but a quantity of between 8 and 10% is preferred. The cement and the beryllia are first thoroughly mixed and then a quantity of water is added so that a weight ratio of between 0.5 and 0.7 for water:cement is obtained. The water is best added gradually so that lumping is avoided. Mixing is then continued for about 20 minutes and discontinued before balling occurs.

Thereafter the mixture is molded into elements of the shape, or "shapes," desired. Either a crucible is directly produced by using a properly shaped mold, e.g. of steel, or else, for very large crucibles, bricks or other similar structural elements are formed, assembled and bonded by cement. In the term "shapes" crucibles are to be included. After molding, the shapes are allowed to harden in a moist atmosphere, which is accomplished by covering them with a wet sheet; a period of time of from 16 to 24 hours is allotted for this hardening step. Thereafter the wet sheets are removed, and the shapes are allowed to dry in air.

The dry shapes obtained by the above procedure were examined as to their "apparent porosity," which is the percentage of open pores accessible to water, while the body was immersed. Details on this test are given later. This apparent porosity usually ranged from 3 to 30% in the dried shapes.

The dried shapes are then introduced into a furnace and heat-treated there at between 700 and 800° C. for the removal of the water of hydration; then they are brought to about 1200° C. for bonding. Finally, the shapes are fired at a temperature of between 1200 and 1600° C. This firing temperature should be attained very slowly, for instance, within about 8 hours, and the firing temperature is held for about 3 hours. Thereafter the shapes are slowly cooled in the furnace to approximately from 400 to 300° C. within about 8 hours, whereupon they are removed from the furnace.

After this treatment the shapes were again examined as to apparent porosity and bulk density. The apparent porosity was determined by immersing the shape in water at room temperature and then applying a vacuum until air bubbles had ceased to develop. This usually took from 5 to 8 hours. Thereafter the vacuum was released and the shape was weighed in air and also in water to determine its volume. The apparent porosity, which is the percentage of open pores per volume of the shape, then is $$\frac{(\text{weight of water-soaked shape in air} - \text{weight of dry shape}) \times 100}{\text{weight of soaked shape in air} - \text{weigh of soaked shape in water}}$$

The bulk density is expressed by $$\frac{\text{weight of dry shape}}{\text{weight of soaked shape in air} - \text{weight of soaked shape in water}}$$

The shapes had a higher apparent porosity after firing than after drying; the average porosity was about 15%, but frequently was as high as 25%. This increase of porosity probably was due to the removal of the water of hydration. It is obvious, of course, that a porosity of 15% is too high for crucibles, or structural elements of crucibles, that are to be used for the processing of molten salts, because the salt would permeate the crucible walls and cause extremely hazardous conditions, in particular when the material to be processed is radioactive.

After these determinations, the shapes were again dried in a furnace heated to slightly above 100° C. Upon cooling, the glaze composition was applied to the surfaces to be protected. Silica is not suitable as a component of the glaze composition, because it is reduced by molten magnesium. The base of the glaze composition has to be an oxide that is nonreactive with the materials to be processed in the crucible. It also should be a low-melting composition that does not crystallize, it should react with the body and form a nonimpervious glasslike layer thereon or better yet therewith. It should not exhibit any grain growth upon reaction.

A great number of glaze compositions were examined, but only two were found satisfactory. One that was operative consisted of from 40 to 65%, preferably 55% by weight, of alumina, from 6 to 15%, preferably 10% by weight, of magnesia, and from 25 to 45%, but preferably 35%, of calcium oxide. Another composition that proved suitable contained from 25 to 30% of alumina, from 40 to 50% of magnesia and from 20 to 35% of beryllia. The very best composition was a mixture containing about 27.5% by weight of beryllia, 28% of alumina and 44.5% of magnesia; this will be illustrated in the example below.

The glaze composition can be applied by brushing it on in the form of a slip or paste in a liquid medium of water or alcohol. Another satisfactory method of putting the glaze on is by plasma spraying, which is melting and spraying by an arc at a temperature of between 10,000 and 20,000° C.

It was found advantageous to apply the glaze in two installments, each time in a layer of between 1 and 2 mils, and to fire each layer separately for about 3 hours at between 1200 and 1600° C., but preferably between 1500 and 1600° C. The apparent porosity of the shapes after the application and firing of the two coatings was usually reduced to less than 1%.

The structural elements or shapes thus prepared were cut in halves and examined miscroscopically. The microphotographs showed no distinct surface layer, which indicates that the glaze had reacted with the fired shape. The layer near the surface proved to have considerably greater density than the inner layers.

In the following, an example is given for illustrative purposes.

EXAMPLE

To crushed beryllia whose particle size ranged between minus 20 and minus 200 mesh, dry calcium aluminate was added as cement in a quantity corresponding to 15% by weight, and the mixture was gradually moistened with water in an amount to yield a water:cement weight ratio of 0.8. This mixture was stirred for 20 minutes and then formed into bricks 3" x 1.5" x 0.6"; the bricks were first allowed to harden for 24 hours while under a wet sheet and then air-dried. These dried bricks then had an apparent porosity of 30%. The bricks were placed into a furnace and "dehydrated" at about 750° C.; thereafter the temperature was raised to 1200° C. and finally slowly to 1530° C.; this firing temperature was maintained for 3 hours. The furnace was then cooled to about 350° C. slowly within 8 hours, whereupon the bricks were removed from the furnace. The bricks obtained averaged a density of 2.62 and an apparent porosity of 15.5.

Twelve of the bricks thus produced were then coated using a different glaze or cement composition for each. The glazes were applied in the form of water suspensions, except where they contained magnesium oxide or calcium oxide, when the liquid medium was alcohol. The coatings were applied in 1- to 2-mil thick films by brushing. The coated bricks were fired for 3 hours at about 1600° C. after each coating. The twelve glaze compositions used are shown in Table I.

Table I

| Constituent | Coating Composition (weight percent) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| BeO | 22 | | 25 | 27.5 | 10 | 31 | | 43.0 | 40 | 100 | 40 | | |
| Al$_2$O$_3$ | | 32 | 28.0 | | 55 | 31.5 | | | | 24 | 40 | 55 |
| CaO | | 43 | | | 28 | 35 | 20.0 | | | 6 | 10 | 35 |
| MgO | | | 44.5 | | | 10 | 5.5 | | | 3 | 5 | |
| La$_2$O$_3$ | 73.3 | | | | | | | 60 | | | | |
| SrO | | | | | 41 | | | | | 27 | 45 | 10 |
| Li$_2$O | 4.7 | | | | | | | | | | | |
| BaO | | | | 90 | | | | | | | | |

Coating compositions Nos. 1–6 had been melted prior to application to the respective bricks at from 1300 to 1600° C. and ground to fine powder, while the remaining coating compositions Nos. 7–12 had been merely mixed with the suspending fluid.

Some of the 12 bricks thus produced showed poor surface conditions and therefore were not given any examination. The two bricks that at first glance appeared satisfactory were tested for their bulk densities and apparent porosities. The results of these tests and the corresponding data of uncoated bricks are summarized in Table II.

Table II

| | Bulk Density (gm./cc.) | Apparent Porosity (percent) |
|---|---|---|
| Uncoated | 2.62 | 15.5 |
| Coated twice with coating No. 3 and fired at 1,600° C | 2.70 | 0.78 |
| Uncoated | 2.37 | 22.0 |
| Coated twice with coating No. 6 and fired at 1,600° C | 2.80 | 1.60 |

The above data show that only coating No. 3 resulted in completely impervious bodies. Composition No. 6 on beryllia was also satisfactory, but coating No. 3 was best.

It will be understood that the invention is not to be limited to the details given herein but that it may be modified within the scope of the appended claim.

The embodiments of the invention in which an exclusive property or privilege is claimed are defined as follows:

As a new article of manufacture, a fired mixture consisting essentially of 85–92 percent by weight of beryllium oxide and from 8–15 percent by weight of calcium aluminate coated with a fired layer of a mixture consisting of alumina, magnesium oxide and an oxide selected from the group consisting of beryllium oxide and calcium oxide.

References Cited by the Examiner
UNITED STATES PATENTS

| | | | |
|---|---|---|---|
| 396,693 | 1/89 | Hastings | 106—105 |
| 2,538,959 | 1/51 | Ballard | 156—89 |
| 3,010,835 | 11/61 | Charles et al. | 106—64 |
| 3,037,874 | 6/62 | Garvey | 106—39 |

EARL M. BERGERT, *Primary Examiner.*